Aug. 6, 1929.                J. L. SOWERS                1,723,385
                             SUPPORT STAND
                           Filed May 23, 1927
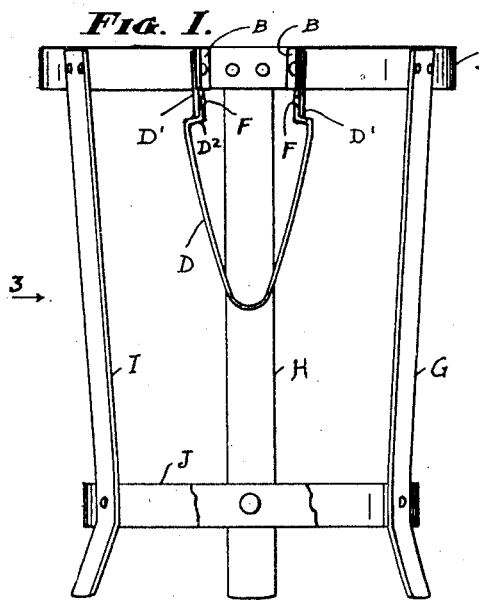
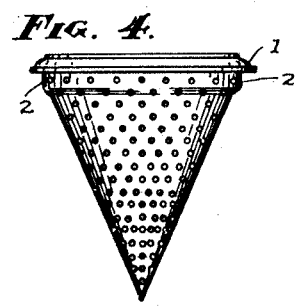
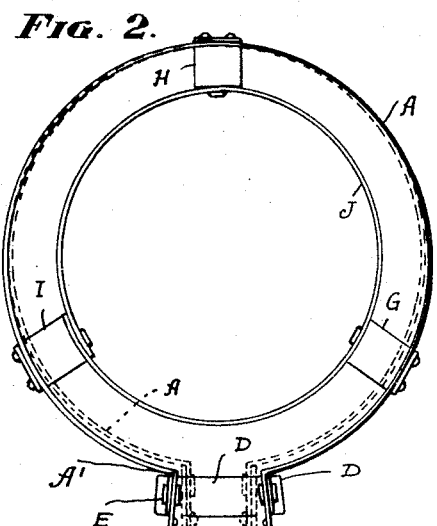
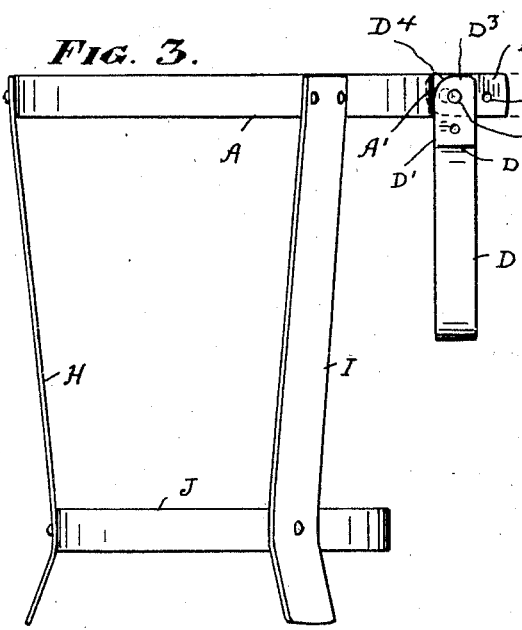
INVENTOR
JAMES L. SOWERS
ATTORNEY.

Patented Aug. 6, 1929.

1,723,385

UNITED STATES PATENT OFFICE.

JAMES L. SOWERS, OF MUNCIE, INDIANA, ASSIGNOR TO THE TYLER MANUFACTURING COMPANY, OF MUNCIE, INDIANA.

SUPPORT STAND.

Application filed May 23, 1927. Serial No. 193,750.

This invention has for its object to provide a support stand or portable holder for kitchen utensils and the like, and has especial reference to support stands for vegetable or fruit presses.

A vegetable press of the kind referred to consists of a conical perforate receptacle having its annular neck reinforced by a flanged or projecting ring, and in said receptacle is operable a cone shaped crusher. For the convenient and effective use of such receptacle and crusher, it is essential that the said receptacle may be held firmly at desired position above the surface upon or within which the pressed contents of the receptacle is to be discharged.

The purposes of this invention are to provide a support stand which is capable of being easily secured to, and as easily disengaged from said receptacle, and which device when not in use will occupy a minimum amount of space. More specific objects of the invention are to provide a support stand which is capable of being easily handled and which is light in weight and sanitary, and is not liable to derangement. Further aims of the invention are to provide a device of the kind described which is economical of manufacture, and of handling in shipping and merchandising.

The advantages sought by my invention are accomplished by the new construction, combination and arrangement of parts described in the following specification, and illustrated in the accompanying drawings. The invention is defined in the appended claims.

The several parts of my improved support stand are identified in the different views in the drawings, by suitable characters of reference applied thereto. In the drawings.—

Figure 1 is a front view of my improved support stand, in readiness to receive the receptacle or other utensil which is to be retained, the handle being in the folded down or vertical position.

Figure 2 is a plan view of Figure 1.

Figure 3 is a side view of the invention as seen in the direction of the arrow 3 in Figure 1.

Figure 4 is a view illustrating the general form and structure of a receptacle of the kind above referred to.

My invention contemplates the combination and arrangement of a resilient metal neck band, its ends being bent at an angle to constitute similar complemental arms, and which arms occupy spaced divergent positions, a handle element also made of resilient strap metal and which is of U shaped formation, its ends being fastened to the said arms at their base portions. The cooperative action of these members is such that when the handle is compressed in the grasping thereof by the user, the arms are caused to be drawn toward each other, thereby constricting the said neck band. Upright members or legs have their upper ends secured at spaced positions on said neck band, and their lower portions are secured to a circular frame member which is of diameter less than that of the neck band, thereby causing the uprights to occupy position inclined accordingly. A vegetable press receptacle of the kind for which my improved support stand is especially adapted is shown in Figure 4, the annular mouth thereof being provided with a flange or rim 1, and the neck 2 of the receptacle being substantially vertical in formation.

In the support stand illustrated herein and embodying my invention, the height is about eight and one half inches, and the diameter of the neck band is about six and one half inches. The strap metal A which is made of steel flat wire about three quarters of an inch in width and one thirty second of an inch in thickness, is of the predetermined length required, and its ends are bent at an angle to constitute the similar arms B and B. Near the base of each of these arms there is provided a hole to receive a pin hereinafter referred to; and at a location distant from said pin and near the end of the arm and on the outer side thereof, is a recess C. This recess is formed by indentation by a suitable punch press tool.

The degree of curvature imparted to the neck band in the curling of same is such that its normal form is that of the expanded status shown in Figure 2, the arms B and B standing apart a distance of such measure that a drawing of same toward each other slightly, causes the neck band to be constricted to smaller diameter. Combined with the neck band A is a handle element so constructed that when grasped by the hand, it serves not only as a handle by which the device may be lifted and held at desired position, but by which the neck band may be constricted to true circular form. This handle consists of a length of resilient strap metal D bent into the U shaped form as shown in Figure 1. At a suitable distance from the ends of the shank portions D' are provided offsets D2 the functions of which will be presently referred to. The ends of the shanks of the handle are fastened pivotally to the arms B and B by headed pins E. The said pins E are riveted sufficiently that while the ends of the handle member are held securely, the handle is capable of being moved thereon. Located at a distance from said pins so as to register with the recesses C in the arms of the neck band when the handle is moved to the raised or dotted line position, are studs F. These studs F are formed by indentation by a suitable punch press tool. The normal position of the handle D is that shown in the drawings, same being disposed at a right angle to the arms B and B. The ends D3 of the shanks of the handle are cut at a right angle, and the lower corners have the rounded faces D4.

The uprights G, H, and I are made of strip steel about three quarters of an inch wide and about one sixteenth of an inch in thickness. The upper ends of these uprights are riveted to the outer sides of the neck band, the upright H being located at position diametrically opposite the arms B and B. The distance between the upright H and the uprights G and I, and their proximity to the arms B and B are such as to afford balance for the support stand, and rigidity and strength for the device as an entirety when the neck band is at constricted or gripping position in engagement with the neck of the receptacle. The lower portions of these uprights are bent outwardly to constitute feet, and at positions just above the bends, they are riveted securely to a circular frame member J. The diameter of this frame ring J is that degree less than the diameter of the neck band, that the uprights are held at positions slightly inclined, the effect of such construction being to suitably retain the neck band at position whereby the upper edges of the arms B and B are slightly flared. By the simple construction just described, the several parts so cooperate with each other that the structure as an entirety is stout and rugged, although light in weight. The pressure of the lower edges of the arms against the inner sides of the shanks of the handle cause the handle to be held firmly in the dropped position or in the upright position so that it may be easily grasped by the hand for raising same.

A support stand constructed in accordance with my invention is not only economical of manufacture, but is strong and durable and light in weight. Also it occupies relatively small space and is therefore capable of being economically handled in manufacturing and merchandising.

The invention in readiness for use appears as shown in the drawings, the handle being at the dropped or vertical position and the neck band being in the expanded position or status. To use the invention, the receptacle is lowered therein, the flange 1 coming to rest upon the upper edge of the neck band. The user then simply applies downward pressure on the handle (thereby holding the support stand firmly on its feet) at the same time moving the handle upwardly. In this movement upwardly of the handle, the studs F pass the lower edges of the arms B and B and snap into seated engagement with the recesses C; the rounded faces D4 passing the angular seat A' of the neck ring, and the edges D3 becoming engaged with the said seats A'. Further movement upwardly of the handle is prevented by the edges D3 and the studs F; moreover the tension of the sides of the handle against the arms B and B contribute to the close coengagement of these parts so that the structure is stiff at this connection and the handle is held securely against pivotal movement. The firm grip retained on the handle by the hand, and the urge of the sides of the handle toward each other, causes the neck band to be constricted to engagement with the neck 2 of the receptacle. In this status the receptacle is suitably supported for receiving the contents which are to be operated upon. In performing the operation of crushing the receptacle contents, the user in grasping and maintaining a hold on the handle, automatically causes a further constriction of the neck band, the latter thus being bound and maintained in tight gripping engagement with the neck of the receptacle. The offsets D2 of the handle permit of the user's first finger being applied against the shanks D1 thereby facilitating a comfortable and tight hold on the handle. The frictional area of the neck band extending practically completely around the neck of the receptacle, the latter is held immovable therein, so that the operation of crushing may be accomplished efficiently and with a minimum of effort and without lost motion. Release of the receptacle from the said neck band is easily accomplished simply by relaxing the grip on the handle, thus permitting the neck band to return to the expanded position. The receptacle and its contents may then be lifted apart therefrom, and is then capable of being emptied and thoroughly cleansed independently of the support stand.

My invention is applicable to embodiment in support devices of various sizes and forms, and for articles generally having circular form; and it will be understood that modifications may be made in the formation of the several parts, and in the details of construction, without departing from the spirit of the invention or sacrificing any of its advantages.

What I claim as my invention, and desire to secure by Letters Patent, is—

1. A support device of the kind described, comprising a divided resilient circular metal band having its ends bent at an angle to constitute divergent opposed spaced apart arms, a handle member of resilient strap metal bent into U shaped form its ends being pivotally connected to the base portions of the said arms and at an angle thereto, frame upright members having their upper ends secured to the said band, and their lower ends being bent outwardly, and a frame member located at position below the said band to hold the said upright members at slightly inwardly inclined positions.

2. A support device of the kind described, consisting of a divided resilient circular neck band having its ends bent at an angle to constitute divergent spaced apart arms there being a recess in the end portion of each arm, a U shaped resilient handle member having its ends pivotally connected to the base portions of the said arms and being provided with studs which are adapted to register with the recesses in the arms, frame upright members having their upper ends secured to the said neck band, and a frame member having connection with the lower portions of the upright members to hold the said upright members at slightly inwardly inclined positions.

3. A neck band for support stands of the kind described, consisting of a divided circular band of resilient strap metal having its ends bent at an angle to constitute divergent spaced-apart arms there being a recess in the end portion of each arm and a seat at the base of the arm, and a U shaped handle member of resilient strap metal having straight transverse end faces and rounded corners and being pivotally connected to the base portions of the said arms, there being studs in the sides of the handle which are adapted to register with the recesses in the arms.

JAMES L. SOWERS.